United States Patent [19]

Bagley et al.

[11] Patent Number: 5,393,499
[45] Date of Patent: Feb. 28, 1995

[54] HEATED CELLULAR SUBSTRATES

[75] Inventors: Rodney D. Bagley, Big Flats; Gaylord L. Francis, Painted Post, both of N.Y.; Andrew Herczog, Melbourne, Fla.

[73] Assignee: Corning Incorporated, Corning, N.Y.

[21] Appl. No.: 161,126

[22] Filed: Dec. 2, 1993

Related U.S. Application Data

[63] Continuation of Ser. No. 893,256, Jun. 3, 1992, abandoned.

[51] Int. Cl.6 ............................................. F01N 3/10
[52] U.S. Cl. ................................. 422/174; 422/173; 422/177
[58] Field of Search ..................... 422/173, 174, 177

[56] References Cited

U.S. PATENT DOCUMENTS

| | | | |
|---|---|---|---|
| 3,259,454 | 7/1966 | Michalko | 422/173 |
| 3,413,096 | 11/1968 | Britt | 422/173 |
| 3,581,489 | 6/1971 | Camin et al. | 60/30 |
| 3,770,389 | 10/1973 | Kitzner et al. | 422/174 |
| 4,928,485 | 5/1990 | Whittenberger | 422/180 |
| 4,976,929 | 12/1990 | Cornelison et al. | 422/174 |
| 5,063,029 | 11/1991 | Mizuno et al. | 422/177 |
| 5,234,668 | 8/1993 | Harada et al. | 422/174 |
| 5,286,460 | 2/1994 | Abe et al. | 422/173 |

FOREIGN PATENT DOCUMENTS

| | | |
|---|---|---|
| 0483708A1 | 5/1992 | European Pat. Off. . |
| 0485179A3 | 5/1992 | European Pat. Off. . |
| 4017360A1 | 12/1991 | Germany . |
| 678020A5 | 7/1991 | Switzerland . |

*Primary Examiner*—Patrick J. Ryan
*Assistant Examiner*—Kam F. Lee
*Attorney, Agent, or Firm*—Angela N. Nwaneri

[57] ABSTRACT

This invention relates to a resistive heating device. In particular, it relates to an exhaust gas apparatus useful for achieving early light-off of catalytic converters comprising a cellular substrate having a layer of conductive material formed thereon and means for activating the device by passing electric current or by exposing the device to an electromagnetic energy field.

23 Claims, 8 Drawing Sheets

HEATED CELLULAR SUBSTRATES

CROSS REFERENCE TO RELATED APPLICATION

This is a continuation of application Ser. No. 07/893,256, filed Jun. 3, 1992, now abandoned.

BACKGROUND OF THE INVENTION

This invention relates to a device and method for heating a cellular or honeycomb structure used for emission control in order to initiate faster light-off in applications such as automotive catalytic converters, diesel particulate filters, wood stove, industrial stacks and any application in which the exhaust gas stream temperature is too low to initiate fast light-off of the catalytic converter. The invention also relates to a device and method for reducing the catalytic light-off time of a cellular or honeycomb structure when such structure is used as a catalytic converter for internal combustion engines.

Pollutants from automotive exhaust systems continue to present a substantial environmental challenge. Catalytic converters have been successful in reducing automotive exhaust pollution. However, as pollution standards become more stringent, there is an increasing need for better and improved converters. When a catalytic substrate or structure is heated to a sufficiently high temperature, the pollutants are catalytically reacted to produce harmless gases.

The Federal Test Procedure (FTP) is an emission certification test used on light-duty vehicles. Cold-start under FTP standards is the starting of an engine after a period of 12 to 36 hours of non-operation in a temperature environment of 20°-30° C. For most cold-starts, there is a time span of one to two minutes between the time the emissions begin, that is, cold start, to the time the substrate heats up sufficiently for catalyst "light-off" to occur. It is estimated that about 50% of the pollutants escaping into the atmosphere from a vehicle equipped with a catalytic converter is generated in these first two minutes following cold start-up. Light-off time is the time it takes to achieve a 50 percent conversion efficiency. The temperature at which about 50% of the pollutants have been converted to harmless gases is the light-off temperature. For most emission control systems, the light-off temperature is generally in the range of about 250° to 350° C. By reducing the light-off time, the amount of pollutants escaping into the atmosphere can be reduced.

Modifications have been made to catalytic converters to increase the rate of heating in order to obtain shorter light-off times. Numerous schemes have been proposed to provide faster light-off of catalytic converters and thereby reduce the amount of pollutants. Mainly, it has been suggested to heat the entire catalytic converter or to heat the inlet gas stream in order to bring the substrate to its light-off temperature faster. Such heating methods are inefficient and require considerable amounts of energy. According to one of these modifications, a heater is disposed in the exhaust gas passage ahead of the catalytic converter. The suggested system consists of two separate sections where one section is a metal substrate catalyst having no heating ability, and the second section is a catalyzed metal substrate with the ability to be heated electrically. The heater first heats up the exhaust gas which then heats up the catalytic substrate. The problem with this method is that a substantial amount of electric power is required to raise the metal substrate to a temperature high enough to heat all of the incoming exhaust gases. Also, the efficiency of this method is low because a significant amount of heat is lost between the heater and the converter. It is not known to preheat a cellular structure or honeycomb to provide an early light-off catalytic converter by forming a resistance heater directly onto the surface of the structure and providing means for activating the surface by passage of electrical current.

Accordingly, it is the object of the present invention to provide a cellular structure for quick light-off by forming a resistance heater on the surface of the structure. The present invention discloses a self-heated catalytic converter suitable for various applications including automotive emissions control, diesel fumes, wood stove, industrial stacks emission and any application in which the exhaust gas stream temperature at start-up is too low to initiate fast light-off.

SUMMARY OF THE INVENTION

Briefly, the present invention provides a resistive heating device composed of a cellular substrate having inlet and outlet end faces, and a matrix of cell walls defining a plurality of cells or passageways extending longitudinally and mutually parallel therethrough between the inlet and outlet end faces, a layer of electrically conductive material formed on the cell walls on the inlet end portion of the substrate such that the layer of conductive material is an integral part of the substrate, and means for activating the device.

In one particularly useful aspect, the device is part of an exhaust gas apparatus for initiating fast light-off of an automotive catalytic converter, the apparatus being composed of an exhaust gas conduit having the device disposed therein, and a catalytic converter.

In another aspect of the invention, an electrically conducting lead or lead wire is directly contacted or connected to the resistance heater. In this aspect, means are provided for securing the lead to the resistance heater, and for connecting the lead to a power source.

In still another aspect, the device is activated by placing the cellular structure in an electromagnetic energy field.

In yet another aspect, the device is formed by applying a layer of electrically conductive material or resistance heater on a substantially electrically conductive substrate having a non-conductive passivating layer formed thereon, such that the electrical resistance of the heater is different from that of the substrate.

In a further aspect, the heater is formed on a substantially non-conductive cellular substrate such as a ceramic honeycomb structure.

As used in this specification, cellular or honeycomb structure or body includes any monolithic structure having inlet and outlet end faces, and having a matrix of walls defining a plurality of open-ended cells or passageways extending longitudinally and mutually parallel therethrough between the inlet and outlet end faces of the body. Preferably, for early light-off applications, the honeycomb is of a flow-through design so that all cells are open at both end faces of the structure. The terms "inlet end portion" and "outlet end portions" as used throughout this specification (including the claims), refer to the regions of the cellular structure adjacent to, close to, or in the region of, the inlet end and outlet end faces respectively. Also, as used in this specification, including the claims, "activating the device" means heating or energizing the device by exposing the structure to an electromagnetic energy field such as a microwave energy source, or by the passage electric current through the electrically conductive layer.

DETAILED DESCRIPTION OF THE INVENTION

The device is produced by forming an electrically conductive material (resistance heater) directly on a cellular substrate and providing means for activating the device. The invention contemplates various methods for activating the device such as by exposing the structure to a high energy electromagnetic energy field such as a microwave energy source, or by the passage of electric current.

In one particularly useful embodiment, the device is part of an exhaust gas apparatus for initiating fast light-off of an automotive catalytic converter. The apparatus is composed of an exhaust gas conduit having a catalytic converter and the device disposed therein. The device may be a separate piece of cellular structure positioned in the exhaust gas stream, in the upstream end of the converter, that is, ahead of the converter such that the exhaust gas contacts the device before it reaches the converter. Alternatively, the device may be catalyzed to eliminate the need for a separate catalytic converter. The advantage of this aspect of the invention is that the heater is separate and distinct from the reactor and therefore, it can be replaced as necessary, independent of the reactor. In this embodiment, the heater can be formed of the same or different material from the reactor to control thermal stress and/or light-off. In a further aspect of this embodiment, the heater can be catalyzed with the same or a different catalyst as the reactor to improve the conversion efficiency of the reactor.

Figure 1:
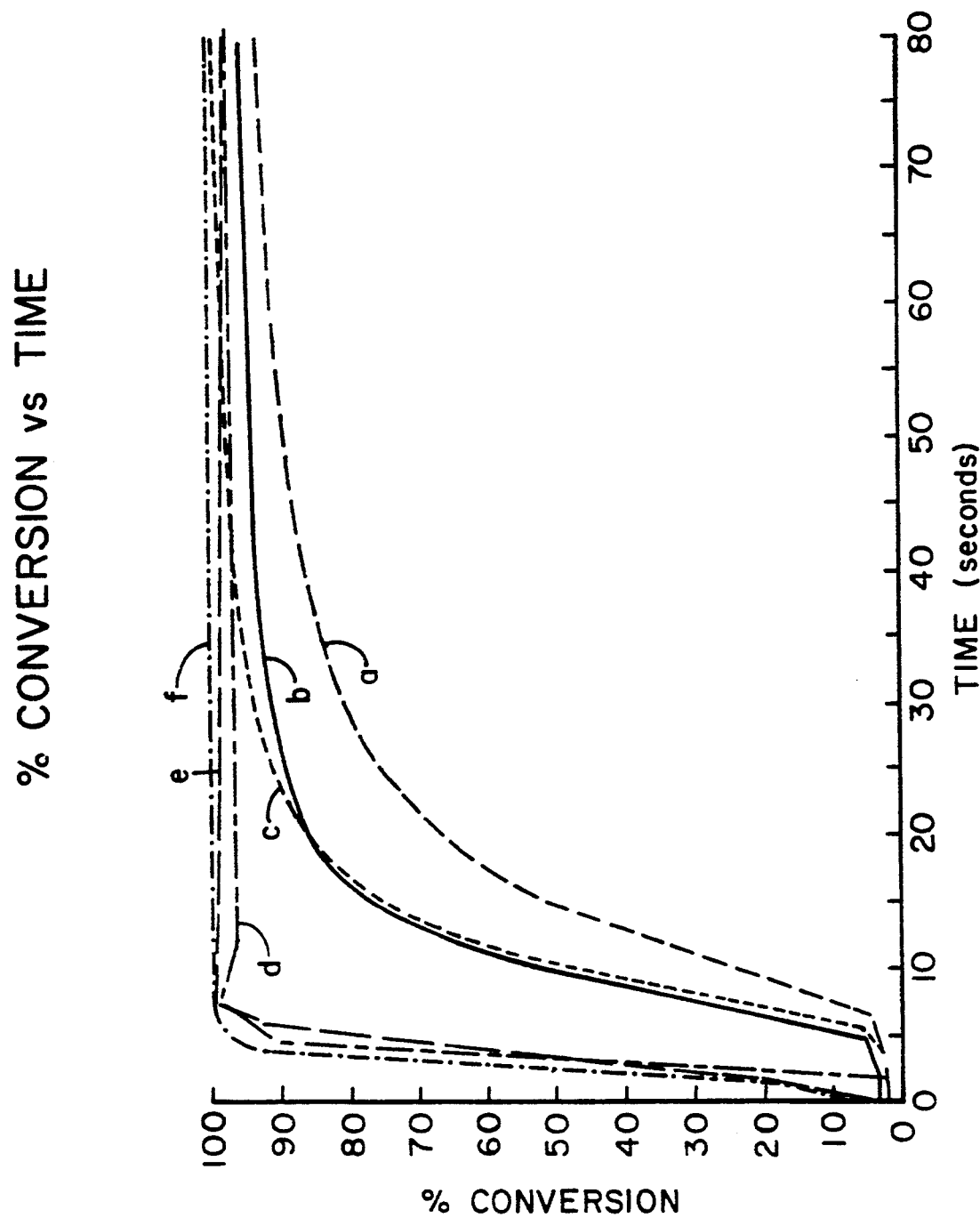
FIG. 1 is a comparative graph showing the benefit of preheating a reactor prior to contacting the reactor with waste gases.

FIG. 1 and Experiment 4, describe the reduction in light-off time achieved by the device and method of the present invention. According to this aspect of the invention, the time required to attain light-off of the catalytic converter is reduced by heating the structure either before or after cold-start. As shown, quicker light-off is attained by preheating the reactor for a few seconds just prior to contacting the reactor with the waste or exhaust gas stream. The device can also be used without preheating. However, as shown, light-off is slower in the latter case because of the cooling effect of the waste gas stream on the reactor which tends to retard the heating process. In cases where the reactor is not preheated prior to contact with the exhaust gases, significantly more energy will be required to reduce the light-off time to that obtained by pre-heating the reactor. In one example using fritted platinum ink contacts and platinum leads, light-off temperatures (about 300° to 345° C.) were achieved in 2 to 3 seconds (without gas flow), using a low porosity (about 20%) cellular cordierite substrate having a thin layer (about 4 microns) of platinum/rhodium alloy applied by sputtering on the inlet end portion by applying about 5.6 volts.

The resistance heater is formed directly on the substrate preferably, on the inlet end portion of the substrate. This reduces the thermal mass to be heated and therefore minimizes the amount of energy required to attain light-off. For automotive catalytic converters, cell wall thicknesses typically vary from the range of about 0.11 to 0.15 mm for thin wall substrates to about 0.18 to 0.20 mm for the standard wall substrates. For other applications the cell wall thickness may be higher. The cells of catalytic converter substrates are generally open at both the inlet and outlet end faces of the substrates such that the open frontal area is preferably, greater than or equal to 50%. For very thin wall substrates, the open frontal area may be as high as about 80%. As a result, the available path for current flow in the thin cell wall substrates may be significantly less than that provided by standard wall or thicker wall substrates. Therefore, when the same thickness of resistance heater is formed on the substrates, the conductance of the thin wall substrate is significantly less than that of the standard wall substrate.

Limiting the resistance heater to the inlet end portion of the substrate also reduces the amount of conductive material needed to form the resistance heater. The total surface area occupied by the cell walls and the resistance heater is preferably less than 50%. For very thin wall substrates, the total surface area occupied by the cell walls and the conductive material can be less than 30% of the open frontal area or plane of entry of the exhaust gas into the reactor. Since the resistance heater of the present device is applied only on a relatively small portion of the substrate, the temperature rise at a given power input level is very fast and the power requirement is significantly lower than that required to heat the entire substrate. Another advantage of the present invention is that by applying the conductive material to the inlet end portion of the reactor, the catalytic process is initially concentrated in the inlet end portion of the converter where the exhaust or waste gas first enters the reactor.

The device (FIG. 2) is produced by forming a layer of electrically conductive material 4 on a substrate, preferably, on a cellular substrate 2 having an inlet and an outlet end faces, 6 and 11 respectively, and having a matrix of walls 20 defining a plurality of cells or passageways 30 extending longitudinally and mutually parallel therethrough between the inlet and outlet end faces, such that all cells 30 are open at both end faces of the substrate 2. Preferably, the layer of conductive material is formed on the inlet end portion 10 of the substrate (i.e., the portion of the substrate around the inlet end face). To minimize the amount of energy required to attain light-off, the structure is heated a few seconds, preferably, less than 7 seconds, more preferably, less than 5 seconds just before the engine is started or before the structure is contacted with the cold exhaust gas stream. Once the engine is heated enough to sustain the light-off temperature, the power to the heater is reduced or shut off. Power to the heater can be controlled by various well known techniques. For example, the power can be programmed to turn on and off after a predetermined time period has elapsed following cold-start or after the temperature of the heater reaches a desired level. The shut-off time can be determined by use of a simple thermocouple or a timer for example. Power supply can also be controlled by monitoring the change in resistance of the heater.

The substrate can be either electrically conductive or non-conductive. Useful non-conductive substrates include substrates formed of cordierite and aluminum silicate (mullite) for example. For automotive applications, cordierite is preferred because of its low thermal expansion properties. For other applications where the heating is slower and where thermal stress is not as severe, other non-conductive materials can be used such as alumina and mullite. Metal substrates on which a non-electrically conducting, passivating layer has been formed are also useful for the practice of this invention.

Any electrically conductive material having suitable properties can be used to form the resistance heater. Preferably, the suitable material is chemically, thermally and electrically stable and is nonreactive with the substrate, catalyst and washcoat at the catalyst operating temperatures. The operating temperature will vary depending on the particular application. For example, for automobile applications, the heater must be stable at temperatures in the range of about 750° to 1000° C., the catalytic operating temperature of most catalytic converters. Preferably, the resistance heater material is capable of being heated rapidly and uniformly. It is also desirable that the resistance be such as to permit the heater to be heated to light-off temperatures by a low voltage source (less than 27 volts) in a relatively short period of time. The current can be either DC or AC depending on the specific application. For automotive applications, the desired voltage requirement is in the range of about 9.5 to 27 volts, preferably in the range of about 9.5 to 13.5 volts. For other applications, the voltage requirement could vary depending on the waste gas composition and the desired light-off temperature. For better thermal control, we prefer any material having positive temperature coefficient of resistance.

Useful metals for the resistance heater of the invention include metals including gold, platinum, rhodium, ruthenium, iron, chrome and alloys of these metals, for example, Nichrome. Refractory compounds such as certain oxides and carbides are also useful for the invention. We prefer platinum and platinum alloys because the platinum can be recovered along with the platinum catalyst in most catalytic converters. It is chemically and thermally stable, has a positive temperature coefficient and can be soldered, welded and brazed to connect leads. Platinum is also catalytically active and is a substantially stable thin film conductor. However, pure platinum and 95 platinum/5 gold alloy films tend to degrade by an agglomeration process when subjected to isothermal aging particularly at 800° and 900° C., causing large increases in resistivity. In a preferred embodiment, the resistance heater is formed of a platinum/rhodium alloy. Rhodium is known to stabilize platinum at high temperatures. When subjected to isothermal aging tests at temperatures of 700° to 900° C. for periods of up to 121.5 hours, we found that the platinum/rhodium alloy film did not develop porosity or discontinuities and generally tended to be more stable than the other materials tested.

The resistance heater can be deposited onto the substrate by various known methods such as sputtering, plasma spraying, evaporation, screen printing, electroplating and other thin and thick film deposition techniques. The heater can also be deposited as a metal powder paste provided the paste material has a sufficiently low viscosity and particle size to permit the paste to penetrate the cells to a desired depth. The paste is then fired or sintered to yield a durable coating or layer. In one embodiment, the heater is formed by first depositing electroless nickel onto the substrate surface, and then electroplating another metal, such as chromium, over the nickel surface. Other methods have been found useful for forming the resistance heater layer. In one experiment, we observed that a sputtered film of 95 Pt/5 Au alloy was more stable than a screen printed powdered film of about the same composition.

The conductive layer must be sufficiently resilient or tough to resist abrasion from exhaust particulates, and have sufficient thickness and conductivity to carry the electrical load and withstand the washcoat process. If the conductive layer is too thick, spalling and peeling may result due to thermal stress. On the other hand, if the conductive layer is too thin, discontinuities may occur leading to hot and cold spots when the structure is subjected to electrical load. We have found that when platinum or platinum alloys such as platinum/rhodium alloy are formed on a cordierite cellular substrate having wall thickness in the range of 125 to 175 microns, conductive layer thicknesses in the range of 0.05 to 8.0 microns, preferably, 0.5 to 5 microns are useful for this invention. Within this range of coating thickness, the net expansion of the combined metal coating and the cordierite substrate is essentially the same as the thermal expansion of the substrate.

The level of conductance of the resistance heater can be controlled by varying the thickness of the cell walls, the porosity or surface smoothness of the substrate, the size and shape of the substrate, the shape of the cells, cell density and orientation of the cells relative to the leads. Conductance can also be controlled by varying the method of deposition of the conductive material or by selecting materials with different resistivities.

The amount of metal needed to produce a given conductance or thickness of conductive material depends on the method of deposition as well as the porosity of the substrate. The higher the porosity, the more material will be required to produce a given conductance and the less uniform the coating. Non-uniform or uneven coatings of the conductive material lead to disruptions in the flow of electric current and variations in the resistance of the conductive layer. A uniform conductive layer is less likely to form cold or hot spots when the heater is subjected to an electrical load. Cold spots reduce the heat exchange efficiency of the heater, while hot spots tend to burn out the heater. The uniformity of the conductive layer is affected by the degree of roughness of the substrate. High or raised spots tend to have thicker coatings than the low or depressed spots which tend to have thinner coatings. Surface smoothness is particularly problematic in the case of porous structures such as certain cordierite honeycomb reactors. For porous substrates, it may be necessary to apply a sufficient thickness of the conductive material in order to fill the low spots and form a uniform layer of conductive material.

For automotive application, it is desirable to limit the voltage requirement to less than 27 volts (that is, the capacity of two standard car batteries), preferably 9.5 to 13.5 volts (the capacity of a single car battery). The voltage requirement can be varied by controlling the resistance of the heater. One way of controlling the resistance is by applying the conductive coating on substrates having standard or thick cell walls.

In one particularly useful embodiment, the resistance heater 4 of the invention is applied to the surface of an electrically non-conductive cellular structure such as a cordierite ceramic honeycomb substrate 2, to form the heated structure of this invention. Commercially available cordierite ceramic substrates have coefficients of thermal expansion of about $6 \times 10^{-7}/°C$. to 1000° C. Resistance heater materials used in the practice of the invention have thermal expansions of more than 10 times that of the cordierite ceramic substrates. For example, platinum, the preferred material of the invention has a coefficient of thermal expansion of about $85 \times 10^{-7}/°C$. to 1000° C. Because of the significant differential in thermal expansion properties, the conductive layer must be sufficiently thin to prevent cell plugging, peeling, cracking, spalling and thermal stress under thermal cycling particularly when the conductive layer is formed on high cell density substrates.

To improve the durability of the resistance heater, a protective layer can be formed over the conductive material, the leads and/or the contacts. Suitable materials for the protective layer include oxides such as cordierite, nitrides, glasses, glass-ceramics, and any durable material which is chemically and thermally compatible with the substrate and the conductive layer. The protective layer can be applied by various other methods such as by washcoat or sputtering.

Figure 2:
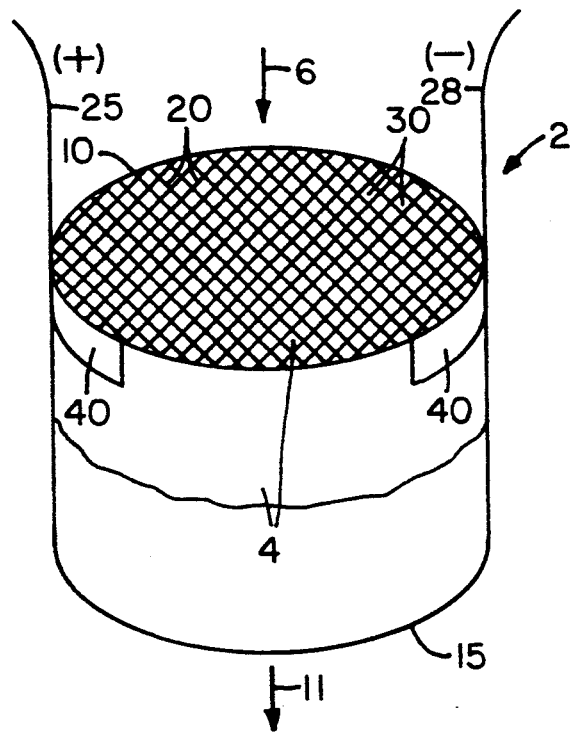
FIG. 2 is a pictorial view of a heated cellular structure.

In one particularly useful embodiment, FIG. 2, activation or heating is accomplished by passing electric current to the structure 2 through electrical leads or lead wires 25 and 28. The leads 25 and 28 can be metal foils, ribbons, mesh, wire wool or wires which are contacted or attached to the heater surface on one end and adapted for connection to an electrical power source on the other end. The leads must have sufficiently low electrical resistance to prevent overheating under electrical load. Preferably, the leads have a lower electrical resistivity than the layer of conductive material. As with the conductive material, the leads must be electrically, mechanically and chemically stable in the exhaust stream and withstand thermal cycling. The lead material must also be compatible with the substrate and contact material at the catalyst operating temperature. Useful metals for the lead include copper, copper coated with platinum or gold, silver alloyed with palladium, platinum, annealed platinum and platinum alloys.

Figure 4:
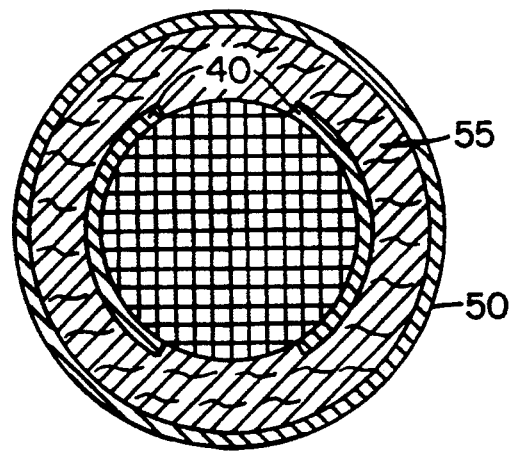
FIG. 4 is a schematic diagram showing a pressure contact arrangement.

The leads are connected to the resistance heater by means of electrical contacts or terminations 40 which are chemically compatible with the heater, the leads and the substrate material under electrical load at the catalyst operating temperature. The leads can be contacted or connected to the heater at the contact or termination by known methods such as soldering, brazing, spot welding, fritted metal inks or by pressure pads. Like the heater and the leads, the contact must be electrically stable under thermal cycling and be capable of withstanding mechanical abrasion and chemical attack from the exhaust particulates and gases. In one embodiment FIG. 4, the leads are connected or contacted to the resistance heater 4 by means of pressure contacts 40. In this embodiment, the leads are held in position by the normal pressure exerted by the metal encasing 50 and resilient packing and/or insulating material 55 in which the structure is fixedly enclosed.

Figure 5A:
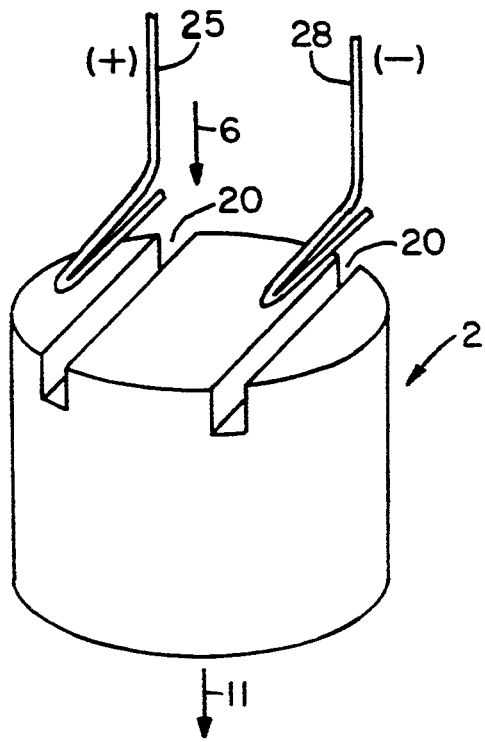
FIGS. 5a and 5b are pictorial diagrams showing use of thick film paste as a contact or termination for the leads.
Figure 5B:
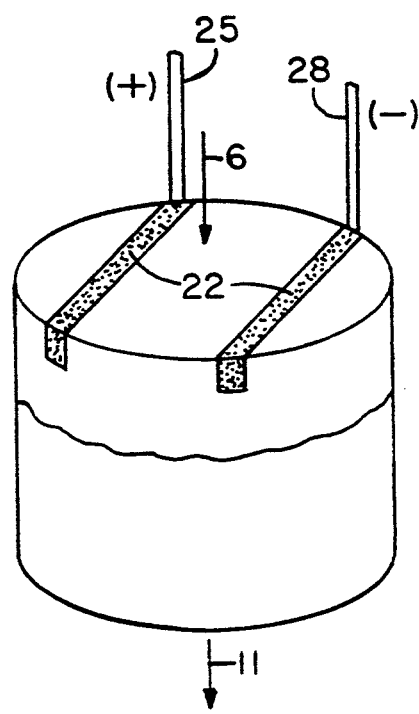
Figure 3:
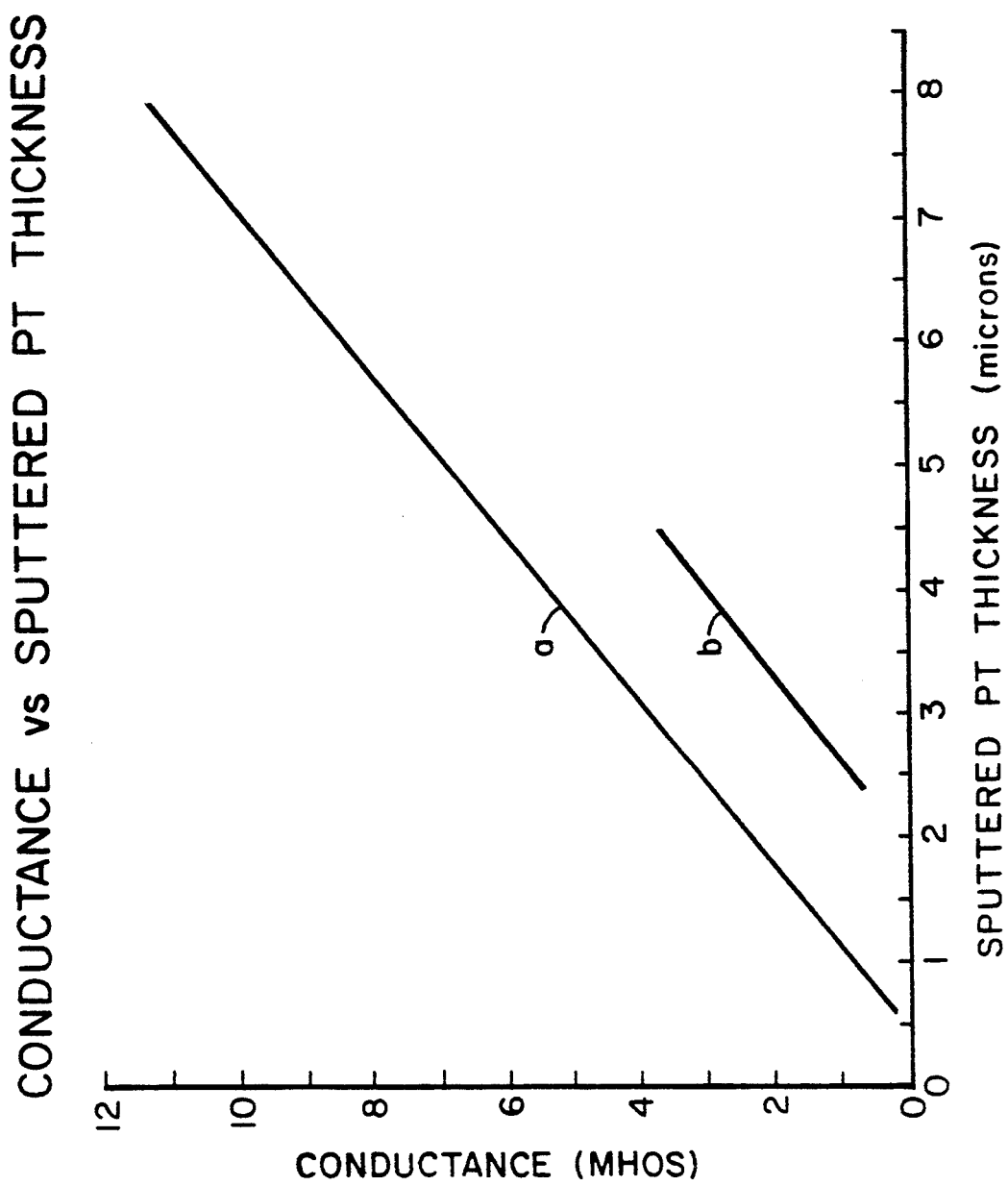
FIG. 3 is a comparative graph showing the relationship between conductance and coating thickness of a conductive layer.

The contact can also be formed of a thick film ink or paste material made of low expansion glass or glass-ceramic or glass frit-based electronic ink. One particularly useful composition includes low expansion glass frit, metal flakes or powder, and an organic vehicle or binder. We have found that a thick film paste, when fired in the temperature range of 700° to 900° C. is useful for the practice of this invention, particularly when the substrate is formed of cordierite and both the conductive layer and the leads are formed of a platinum/rhodium alloy. In this embodiment, the composition of the contact or thick film paste is preferably 75–98.5 wt. % metal powder, more preferably, platinum powder, silver/palladium alloy powder or copper powder and 1.5 to 25 wt. % glass frit. To form the metal paste, 75 to 90% of the metal powder is blended with 10 to 25% of a screening medium or organic vehicle. In one embodiment, the leads are affixed to the heater by bonding the wires to the heater surface using the thick film paste. In another embodiment, FIGS. 5a and 5b, slots 20 are cut into the substrate 2 to accommodate the leads 25 and 28 which are then held in position by filling the slots 20 with the paste 22. In the preferred embodiment (FIG. 5b), a layer of conductive material 4 is formed over the paste 22 to form a continuous conductive surface over the substrate and contacts to provide a continuous current path between the leads and to improve the thermal stability of the thick film paste. When applied over the contacts, the conductive material also acts as a protective layer over the contacts and shields the contacts from both the chemical effect of exhaust gases and abrasion by the exhaust particulates. This is particularly important when the contact material contains silver or copper which are susceptible to sulfur which may be present in the exhaust gas stream. The slots 20 can be linear or non-linear depending on the particular lead termination.

Useful metal powders for the thick film ink include platinum, palladium, silver, rhodium, gold, copper or a combination of these metals. While noble metals are preferred, non-noble metals can also be used but such non-noble metals may require firing in a neutral or reducing atmosphere. In one particularly useful embodiment, the metal powder is a combination of silver (70%) and palladium (30%), designated 5030-2 (available from Degussa Metz Metallurgical Corporation of South Plainfield, N.J.) Silver flake and powder compositions such as those designated SF-10, SF-7E, SF-15ED, SF-15, SF-9 and SFK-NJ (also available from Degussa Metz Corporation) are also useful for the practice of this invention. (The different designations indicate the particle sizes and processing characteristics of the various composition, which information is not published by the manufacturer.) The amount of metal powder needed for the contact material is generally dictated by the density of the metal powder.

Useful organic vehicles or screening medium include solutions of ethyl cellulose, polyvinyl alcohol, methyl cellulose, fish oil, various pine oils and other polymers and oils. In one embodiment, the organic vehicle was prepared by dissolving 6 grams of ethyl cellulose EC-T-100 (from Hercules Inc.) in 100 grams of texanol ester alcohol (available from Eastman Kodak Corporation, N.Y.).

Any glass material which forms a low expansion glass-ceramic upon firing and which is compatible with the substrate and conductive material can be used for the practice of this invention. Examples of suitable materials for this purpose include any low expansion glass or glass-ceramic such as glass-ceramic frit, pre-cordierite frit or other suitable material. Useful glass compositions for this invention are described in U.S. Pat. Nos. 4,714,687, 3,486,871, 4,015,048 and 3,681,097. Particularly useful glass frit compositions include glass-ceramics exhibiting very low coefficients of thermal expansion such as (1) low expansion zinc petalite-beta quartz glass-ceramics which have compositions in the $ZnO$—$Al_2O_3$—$SiO_2$ field, (2) sinterable powdered glasses comprising MgO, $Al_2O_3$, $SiO_2$ and at least one modifying oxide selected from the group consisting of BaO, PbO, SrO and CaO and which are thermally crystallizable at sintering temperatures to yield highly crystalline, low expansion, thermally stable glass-ceramics, and (3) lead titanate-containing crystallizable sealing glass consisting essentially in weight percent of from 60 to 80% of PbO, up to 20% of at least one divalent metal oxide selected from ZnO and BaO such that the total of divalent oxides and PbO is from 60 to 80%, 5 to 18% $TiO_2$, at least 1% $B_2O_3$ and at least 5% $SiO_2$, the total of $B_2O_3$ and $SiO_2$ being from 10 to 20%.

Figure 6A:
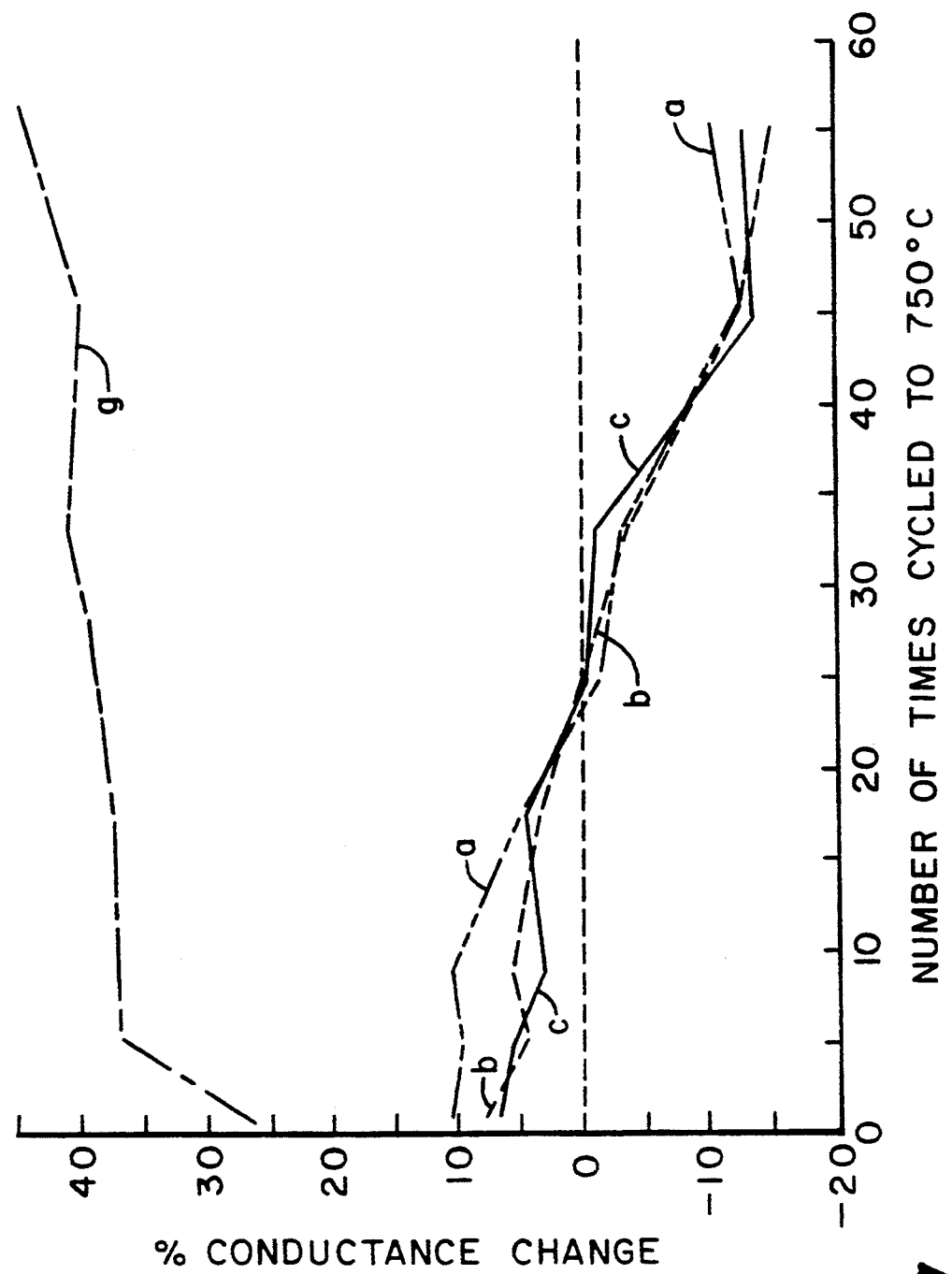
FIGS. 6a through 6d are comparative graphs showing the thermal stability of various thick film paste compositions.

Thick film pastes or inks containing pure silver are not thermally stable as the silver tends to migrate thus reducing the adherence of the contact to the substrate surface. We have found that the thermal stability and adherence to the substrate can be improved by using a silver-palladium alloy. When the silver-palladium alloy is combined with lead titanate glass frit, the termination or contacts appear to be more stable under thermal cycling as shown in FIGS. 6c to 6d. This glass formulation has very low expansion as a result of lead titanate crystallization which occurs during firing. The primary role of titania in this particularly useful composition appears to be the development of a suitable low expansion crystal material (i.e., lead titanate), during thermal treatment. In addition, the lead titanate glass exhibits sufficient fluidity during firing to wet the substrate metal interface where flow is desirable. For applications where flow is not necessary, for example, for glazing applications, the most useful composition of lead titanate glass contains essentially 60 to 80% PbO, 12 to 18% $TiO_2$, 1 to 8% $B_2O_3$, and at least 5% $SiO_2$. When flow or fluidity of the paste is required, the glass composition is preferably 60 to 80% PbO, 0 to 20% BaO plus ZnO, 5 to 12% $TiO_2$, 10 to 20% $B_2O_3$ plus $SiO_2$ collectively, and at least 5% $B_2O_3$ and $SiO_2$ individually. We have found that the lead titanate frit, even though it contains lead, does not adversely react with the platinum.

Figure 7:
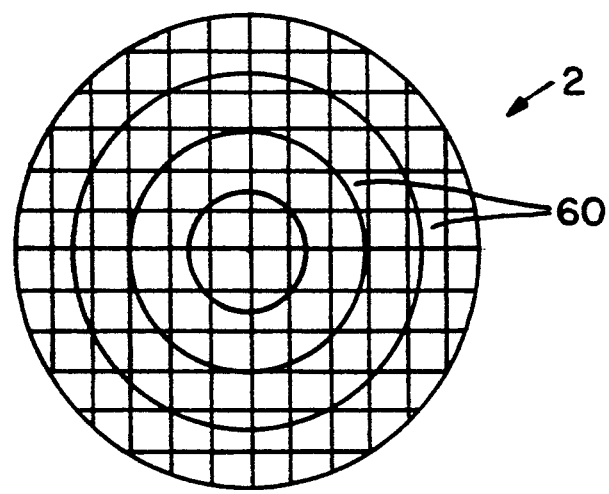
FIG. 7 is a top view of the inlet end face of the substrate showing the use of a susceptor for inductive heating of a heated structure.

In one embodiment, the device is electromagnetically heated by placing the structure in an electromagnetic field. In this embodiment, the heater is formed by contacting a susceptor to the substrate. As shown in FIG. 7, the susceptor or conductive heating wires or ribbons 60 can be at least partially imbedded in the substrate 2. If desired, the layer of conductive material can also function as the susceptor. In this embodiment, the structure can be electromagnetically heated, for example, by microwave radiation or by other suitable electromagnetic heating methods.

For certain applications it may be desirable to deposit an electrically conductive coating on an electrically conductive substrate such as metal substrates formed with iron-chrome-aluminum alloys, or crimped and wrapped cellular bodies made from high temperature alloys such as alloys of nickel and chrome. In such applications, to avoid thermal shock which may result due to mismatch of thermal expansion, the conductive layer can be formed of the same material as the metal substrate. Generally, metals used for high temperature substrates develop a non-electrically conducting passivating oxide layer which allows these metals to withstand repeated use at very high temperatures. According to this embodiment, a non-conductive, passivating layer is formed on the surface of a metal substrate and then an electrically conductive layer is formed over the passivating, non-conductive layer to better control or regulate the conductance of the metal structure. In this embodiment, the conductive layer can be applied to all or part of the substrate in order to regulate or improve the conductance of the metal substrate. If only part of the metal substrate is coated with the conductive material, then it is also contemplated by this invention that only the coated portion would be heated although the metal substrate may also be heated.

Figure 8:
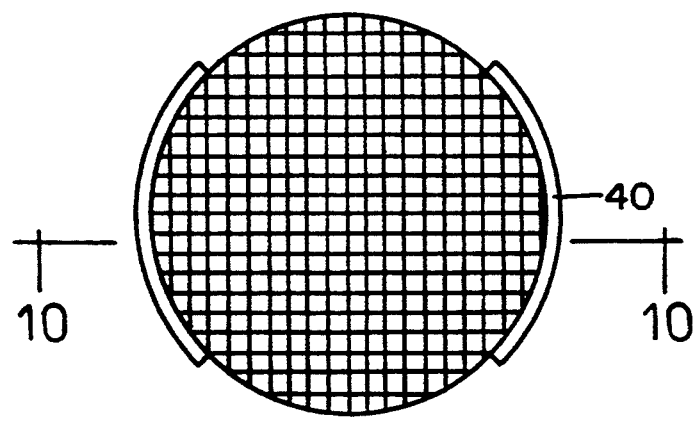
FIGS. 8 and 9 are pictorial diagrams showing various arrangements of the leads and contacts to vary the current path.
Figure 9:
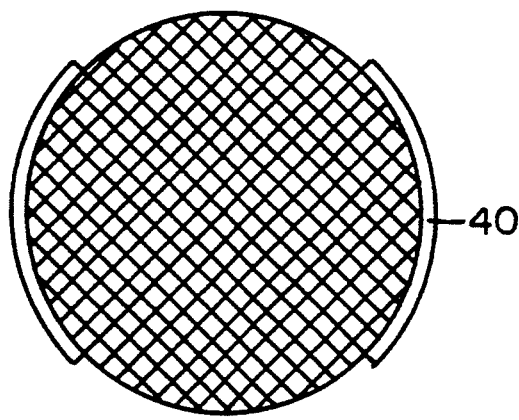

In a particularly useful embodiment (FIG. 2), heating of the structure is accomplished by connecting the leads 6 to a power source and activating the structure by means of a switch to pass electric current to the heater 4. The electric power travels from one lead to another over a current path provided by the resistance heater 4. As shown in FIGS. 8 and 9, the current path can be varied by varying the arrangement and relative positions of the leads. The current path in a typical square-celled substrate can be parallel to the cell walls as shown in FIG. 8 or the contacts can be arranged diagonal to the cell walls (FIG. 9). In the diagonal arrangement, all off the cell walls are heated while in the parallel arrangement, the walls perpendicular to current flow are not heated so that only about half of the cell walls are heated. As a result, the heat transfer area is significantly less in the parallel than in the diagonal arrangement. In the parallel arrangement, several contacts or terminations can be provided so that different pairs of leads can be activated in sequence to provide for more uniform heating of the device.

Generally, reactors or converters are catalyzed with appropriate catalysts for the conversion of exhaust pollutants such as hydrocarbons, carbon monoxide, oxides of nitrogen and the like. In many instances, the catalysts are applied in a washcoat over a suitable substrate such as a honeycomb. As contemplated by this invention, the layer of conductive material can be applied to the substrate either before or after, preferably before, the catalytically active washcoat is applied to the substrate.

The following tests and examples further illustrate the invention but are not intended as limitations.

EXPERIMENT 1

Voltage Requirement

Heat-up times were determined by applying varying voltages to a 1-inch diameter standard wall cordierite honeycomb sample having porosity of about 20%, and which was coated with platinum to a thickness of 4.07 microns, and measuring the time required to char and burn Whatman #41 filter paper in ambient air. At an applied voltage of 7.5 volts, the paper burned/charred within 3.5 to 4.5 seconds. When the voltage was increased to 9.4 volts, the time required to char and burn the paper was reduced to 2.5 to 3.0 seconds.

Thermal Stability of Thick Film Contact Pastes

EXPERIMENT 2

To determine the thermal stability of the thick film pastes or inks various samples of contact inks were subjected to thermal cycling to 750° C. and the change in conductance measured. A platinum sample with no contact ink was used as the control sample g, throughout the experiment. Three contact inks were prepared by mixing silver-palladium (70/30) alloy with three different frits. Sample a, containing zinc petalite-beta quartz glass-ceramic, sample b, containing sinterable powdered glass frit, and sample c containing lead titanate glass frit, were silk screened over the platinum conductive layer (FIGS. 6a and 6b), while the second set of samples, d–f containing the same three glass frits respectively, were screened under the platinum conductor (FIGS. 6c and 6d). In both sets of samples, after the first cycle to 750° C., there was an increase in conductance, perhaps due to thermal consolidation of the platinum film. The same increase in conductance was observed in the platinum control sample.

Figure 6B:
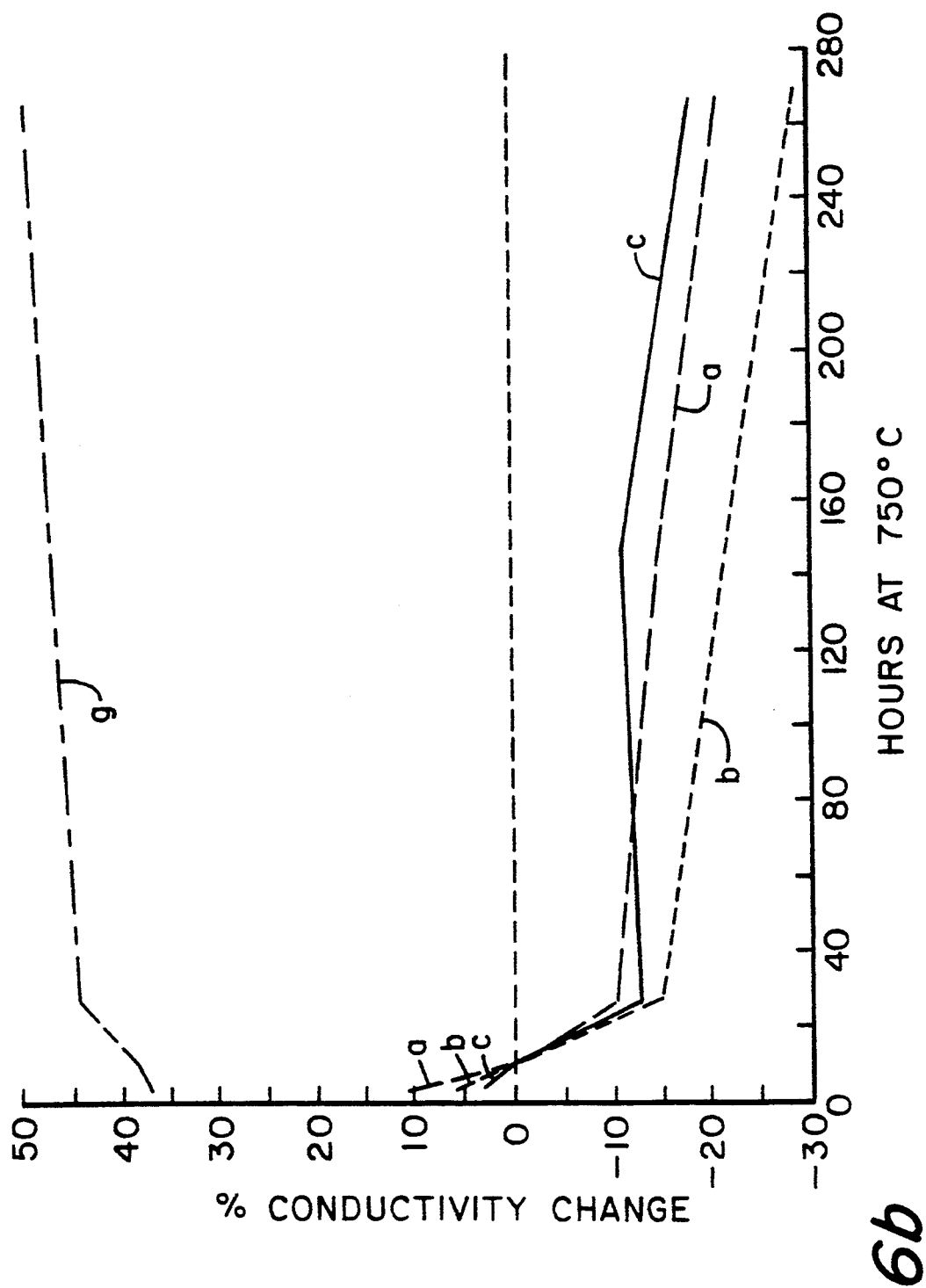
Figure 6C:
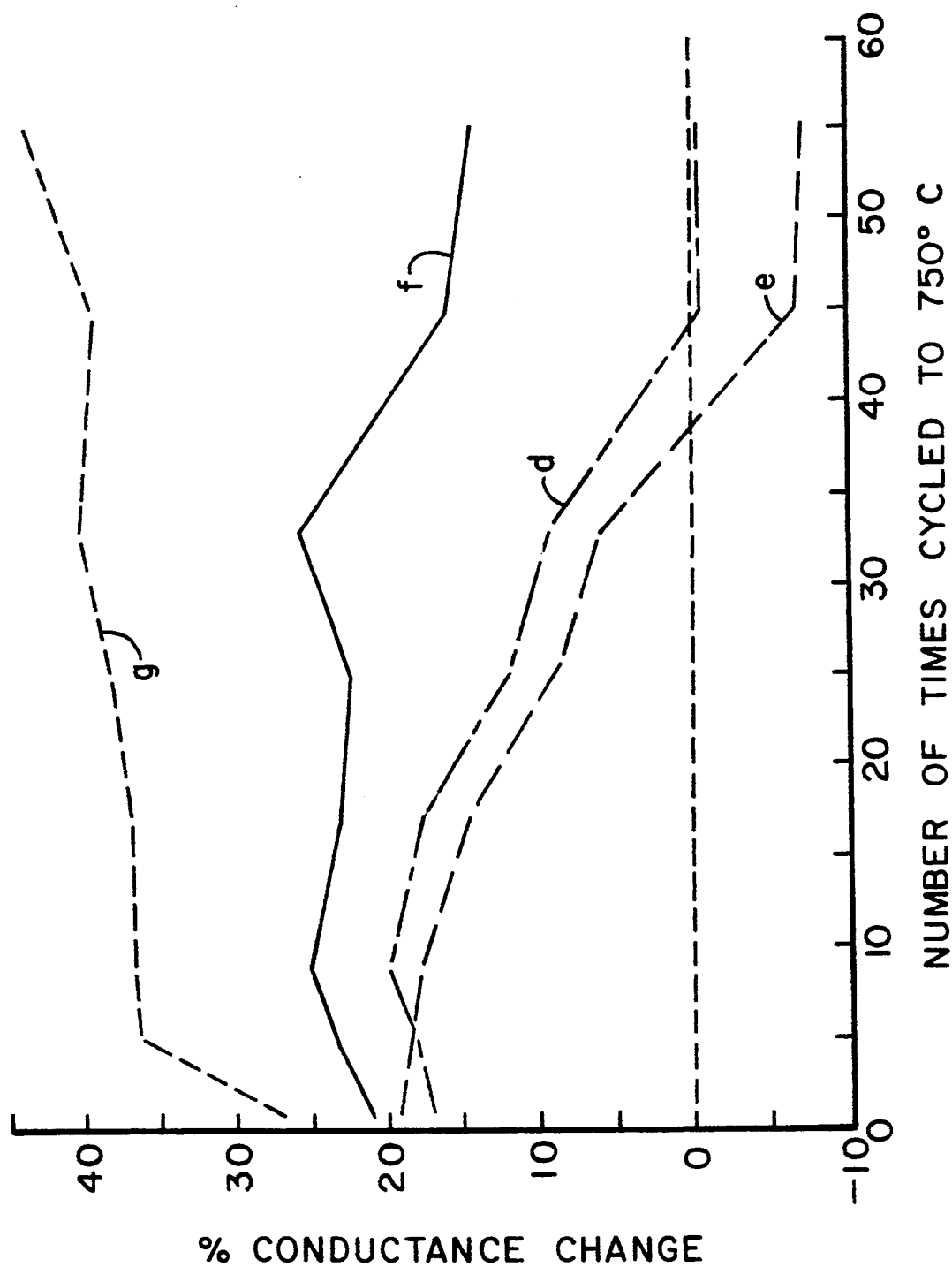
Figure 6D:
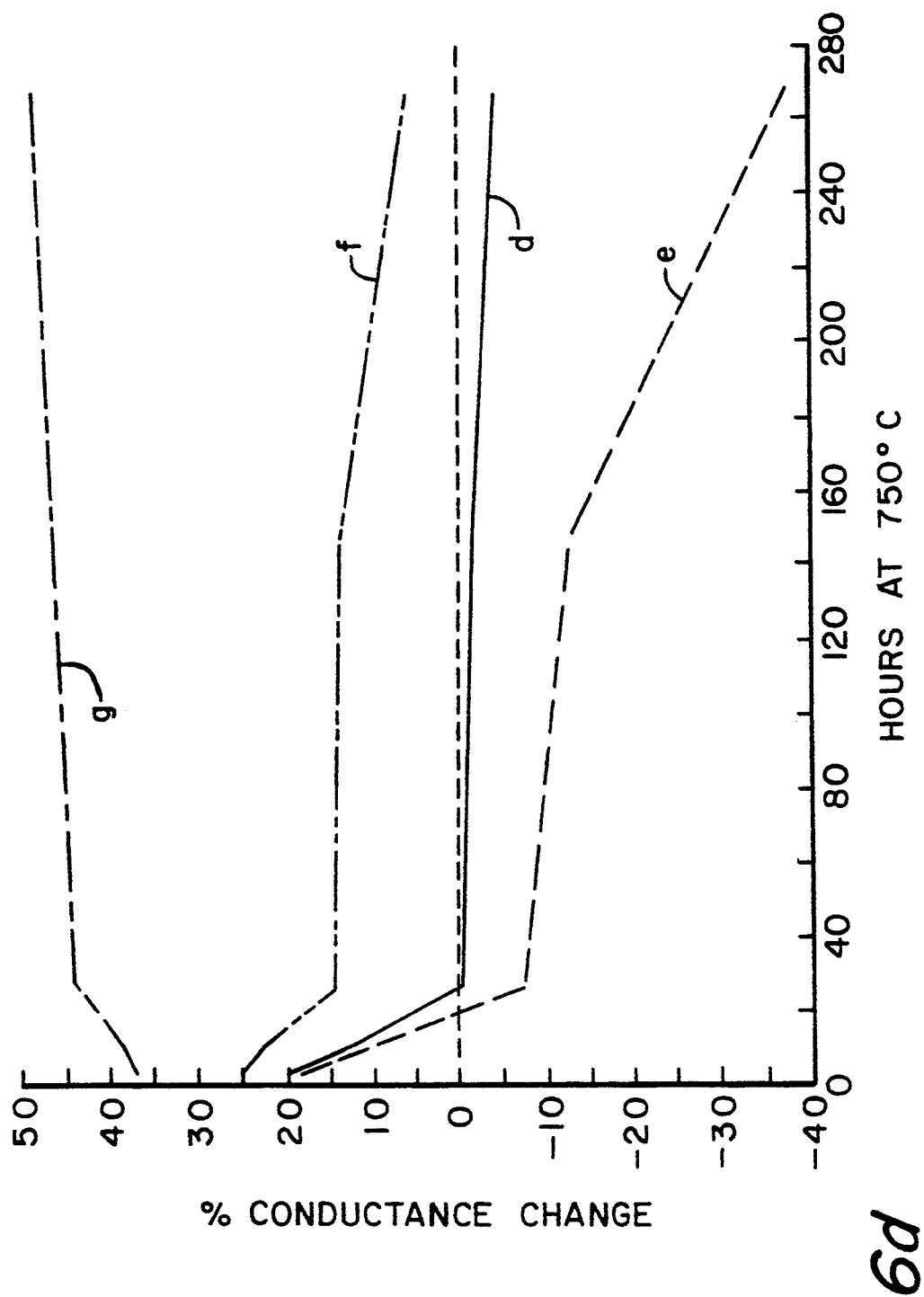

As shown in FIG. 6b, the contact inks containing zinc petalite-beta quartz and sinterable glass frits (Samples a and b respectively) remained stable over 17 cycles after which the conductance rapidly declined. The loss in conductance after 55 cycles was about 10 and 15% respectively. Both samples showed slight cracking at the platinum/contact interface. The contact containing lead titanate frit (Sample c), remained stable after 9 cycles after which the conductance declined rapidly. After 55 cycles, the conductance had declined by about 13%. Unlike the first two samples, no cracking was observed at the platinum/contact interface of the lead titanate frit contact. All three samples were then soaked at 750° C. for 240 hours. The conductance of samples a and b continued to decline, while the conductance of sample c was observed to stabilize over the first 120 hours and then to decline slightly over the next 120 hours (FIG. 6b).

Samples d through f were silk screened under the platinum and cycled in the same manner as samples a–c. As shown in FIGS. 6c and 6d, samples d and e appeared stable over the first 17 cycles but declined rapidly thereafter. After 45 cycles, the samples again appeared to stabilize for the next 10 cycles. Sample e, containing the sinterable powdered glass frit showed some cracking at the platinum/contact interface after 45 cycles. Sample f containing lead titanate remained stable over the first 33 cycles. The conductance declined slightly over the next 8 cycles, but stabilized in the last ten cycles. Again, the samples were soaked at 750° C. for 240 hours. As shown in FIG. 6d, samples d and f remained fairly stable for the entire time, while sample e was stable for the first 129 hours but declined rapidly thereafter.

EXPERIMENT 3.

A third set of contacts were prepared using silver flakes of varying particle sizes. All contacts were prepared using the lead titanate frit and silk screened under the platinum resistance heater. All of the silver contacts showed cracking and delamination of the platinum/contact interface after one cycle at 750° C. The silver inks were poorly adhered to both the platinum and substrate surfaces and substantial amounts of silver had migrated into the platinum layer. Analysis also showed platinum to be present in the silver contact layer indicating inter-diffusion between the various layers.

EXPERIMENT 4

Catalytic Converter Bench Test

Samples were washcoated and catalyzed using the following standard (automobile catalytic converter) slurry composition:

| | |
|---|---|
| Boehmite dispersal | 68.5 g |
| Distilled water | 950.0 ml |
| 1:2 Nitric Acid | 39.0 ml |
| CeO$_2$ doped Al$_2$O$_3$ | 696.0 g |
| Molycorp 99% CeO$_2$ | 253.0 g |
| Surfynol Surfactant | 2.0 ml |

The slurry was milled to an average particle size of about 3.8 microns and the slurry pH was adjusted to the range of 3.6–3.8 using 1:1 HNO$_3$. The substrate was coated with platinum to a thickness of about 4.07 microns by sputtering and then washcoated with the slurry. The washcoated samples were then fired at 650° C. for 3 hours, loaded with 33.33 grams of platinum/ft3 and fired at 650° C. for 3 hours, and then loaded with 6.67 g rhodium/ft3 and again fired at 650° C. for 3 hours to complete the catalyst coating. The washcoated substrate was then preheated for 2 to 3 seconds just before contact with the waste gas. Pre-heating was achieved by applying about 9.4 volts, producing current in the range of about 13.8 to 14.2 amps. Lines a–c represent the conversion of hydrocarbons (HC), carbon monoxide (CO), and nitrous oxides (NOx) respectively, without preheating. Lines d–f represent the conversion of HC, CO, and NOx respectively, using a preheated sample. About 132 watts of electric power was used in running the experiment using simulated exhaust gas.

The pre-heated sample achieved 90% conversion of NOx and CO within 5 seconds of contact with the exhaust gas. The same level of conversion was achieved for hydrocarbons within about 7 seconds of contact. When the same sample was brought in contact with the waste gas without pre-heating, the time required to achieve 90% conversion of NOx and carbon monoxide was increased to about 20 seconds, while it required about 45 seconds to achieve the same level of conversion for the hydrocarbons.

In addition to the embodiments discussed above, it will be clear to persons skilled in the art that numerous modifications and changes can be made to the above embodiments without departing from the intended spirit and scope of the invention.

What is claimed:

1. A resistive heating device comprising:
   a cellular substrate having inlet and outlet end faces, and a matrix of cell walls defining a plurality of cells or passageways extending longitudinally and mutually parallel therethrough between the inlet and outlet end faces;
   a continuous layer of electrically conductive material formed on the cell walls on the inlet end portion of the substrate such that the layer of conductive material is an integral part of the substrate;
   catalyst formed on the substrate; and an activating device selected from the group consisting of an electrical switch and an electromagnetic energy generator.

2. The device of claim 1, further comprising an electrical lead contacted to the layer of conductive material, and means for connecting the leads to an electric power source.

3. The device of claim 2, wherein the leads are formed of electrically conducting material selected from the group consisting of platinum, copper, silver, palladium, rhodium and their alloys.

4. The device of claim 2, wherein the leads are contacted to the layer of conductive material by means of a sintered electrically conductive paste.

5. The device of claim 4, further comprising slots formed on the inlet end portion of the substrate.

6. The device of claim 5, wherein the leads are at least partially imbedded in the slots.

7. The device of claim 6, wherein the layer of conductive material is formed over the electrically conductive paste.

8. The device of claim 4, wherein the electrically conductive paste comprises glass frit and metal powders.

9. The device of claim 8, wherein the metal powder is selected from the group consisting of platinum, silver, palladium, rhodium and copper.

10. The device of claim 8, wherein the glass frit is a low expansion glass selected from the group consisting of (1) low expansion zinc petalite-beta quartz glass-ceramics which have compositions in the $ZnO$—$Al_2O_3$—$SiO_2$ field, (2) sinterable powdered glasses comprising $MgO$, $Al_2O_3$, $SiO_2$ and at least one modifying oxide selected from the group consisting of $BaO$, $PbO$, $SrO$ and $CaO$ and which are thermally crystallizable at sintering temperatures to yield highly crystalline, low expansion, thermally stable glass-ceramics, and (3) lead titanate-containing crystallizable sealing glass consisting essentially in weight percent of from 60 to 80% of $PbO$, up to 20% of at least one divalent metal oxide selected from $ZnO$ and $BaO$ such that the total of divalent oxides and $PbO$ is from 60 to 80%, 5 to 18% $TiO_2$, at least 1% $B_2O_3$ and at least 5% $SiO_2$, the total of $B_2O_3$ and $SiO_2$ being from 10 to 20%.

11. The device of claim 1, further comprising a susceptor contacted to the inlet end portion of the substrate.

12. The device of claim 1, wherein the substrate is electrically conductive.

13. The device of claim 12, further comprising a layer of non-conductive passivating layer formed between the substrate and the layer of electrically conductive material.

14. The device of claim 1, wherein the substrate is formed of electrically insulating material.

15. The device of claim 14, wherein the cell wall thickness is in the range of 0.11 to 0.20 mm.

16. The device of claim 15, wherein the thickness of the conductive layer is in the range of 0.05-4.5 microns.

17. The device of claim 16, wherein all cells are open at both end faces of the substrate and the combined thickness of the cell walls and the layer of conductive material is such that the open frontal area of the substrate is in the range of 50-80%.

18. The device of claim 2, wherein the leads are connected to an electric power source capable of generating 1 to 27 volts of applied voltage.

19. The device of claim 1, wherein the catalyst is a catalytically active washcoat.

20. The device of claim 1, wherein the catalyst is further formed on the layer of electrically conductive material.

21. The device of claim 1, wherein the electrically conductive material is selected from the group consisting of platinum, rhodium, and mixtures of these.

22. The device of claim 21, wherein the cellular substrate is cordierite having wall thickness in the range of 125 to 175 microns, and the layer of electrically conductive material is applied to a thickness in the range of 0.05 to 8 microns.

23. The device of claim 22, wherein the layer of electrically conductive material is applied to a thickness in the range of 0.5 to 5 microns.

* * * * *